US012499564B2

(12) United States Patent
Hold-Geoffroy et al.

(10) Patent No.: US 12,499,564 B2
(45) Date of Patent: Dec. 16, 2025

(54) SINGLE IMAGE CAMERA PARAMETER ESTIMATION (71) Applicants: ADOBE INC., San Jose, CA (US); Université Laval, Québec (CA)

(72) Inventors: Yannick Hold-Geoffroy, San Jose, CA (US); Jianming Zhang, Campbell, CA (US); Dominique Piche-Meunier, Québec (CA); Jean-François Lalonde, Québec (CA)

(73) Assignee: Adobe Inc., San Jose, CA (US)

( * ) Notice: Subject to any disclaimer, the term of this patent is extended or adjusted under 35 U.S.C. 154(b) by 180 days.

(21) Appl. No.: 18/205,413

(22) Filed: Jun. 2, 2023

(65) Prior Publication Data
US 2024/0404090 A1 Dec. 5, 2024

(51) Int. Cl.
G06T 7/80 (2017.01)
G06T 7/50 (2017.01)
G06T 15/20 (2011.01)

(52) U.S. Cl.
CPC .............. G06T 7/50 (2017.01); G06T 7/80 (2017.01); G06T 15/205 (2013.01); G06T 2207/20081 (2013.01)

(58) Field of Classification Search
CPC ...................................................... G06T 7/80
See application file for complete search history.

(56) References Cited

U.S. PATENT DOCUMENTS

2012/0195492 A1* 8/2012 Ali .................... G06T 5/20 382/154
2016/0057341 A1* 2/2016 Nakayama ............ H04N 23/95 348/207.1
2023/0186550 A1* 6/2023 Thurston, III .......... G06T 5/92 345/419

OTHER PUBLICATIONS

Suwajanakorn, Supasorn, Carlos Hernandez, and Steven M. Seitz. "Depth from focus with your mobile phone." Proceedings of the IEEE conference on computer vision and pattern recognition. 2015. (Year: 2015).*
Zhang, Anmei, and Jian Sun. "Joint depth and defocus estimation from a single image using physical consistency." IEEE Transactions on Image Processing 30 (2021): 3419-3433. (Year: 2021).*
D'Andrès, L. D., et al., "Non-parametric Blur Map Regression for Depth of Field Extension", IEEE Transactions on Image Processing, vol. 25, Issue 4, pp. 1-14 (2016).
Anwar, S., et al., "Depth Estimation and Blur Removal from a Single Out-of-focus Image", In British Machine Vision Conference, vol. 1, pp. 1-12 (2017).
Bae, S., and Durand, F., "Defocus Magnification", In Computer Graphics Forum, EUROGRAPHICS, vol. 26, No. 3, pp. 571-579 (2007).

(Continued)

Primary Examiner — Ryan McCulley
(74) Attorney, Agent, or Firm — Shook, Hardy & Bacon L.L.P.

(57) ABSTRACT

In various examples, a set of camera parameters associated with an input image are determined based on a disparity map and a signed defocus map. For example, a disparity model generates the disparity map indicating disparity values associated with pixels of the input image and a defocus model generates a signed defocus map indicating blur values associated with the pixels of the input image.

20 Claims, 8 Drawing Sheets (56) References Cited

OTHER PUBLICATIONS

Eigen, D., et al., "Depth Map Prediction from a Single Image using a Multi-Scale Deep Network", NIPS'14: Proceedings of the 27th International Conference on Neural Information Processing Systems, pp. 1-9 (Jun. 9, 2014).
Favaro, P., and Soatto, S., "A Geometric Approach to Shape from Defocus", IEEE Transactions on Pattern Analysis and Machine Intelligence, vol. 27, No. 3, pp. 1-12 (Mar. 2005).
Fu, H., et al., "Deep Ordinal Regression Network for Monocular Depth Estimation", In IEEE Conference on Computer Vision and Pattern Recognition (CVPR), pp. 2002-2011 (2018).
Georgiadis, K., et al., "Adaptive Mask-based Pyramid Network for Realistic Bokeh Rendering", arXiv:2210.16078v1, pp. 1-16 (Oct. 28, 2022).
Girod, B., and Scherock, S., "Depth from Defocus of Structured Light", Optics, Illumination, and Image Sensing for Machine Vision IV, SPIE vol. 1194, pp. 209-215 (1990).
Godard, C., et al., "Digging Into Self-Supervised Monocular Depth Estimation", In International Conference on Computer Vision (ICCV), pp. 3828-3838 (2019).
Godard, C., et al., "Unsupervised Monocular Depth Estimation with Left-Right Consistency", In IEEE Conference on Computer Vision and Pattern Recognition (CVPR), pp. 270-279 (2017).
Gur, S., and Wolf, L., "Single Image Depth Estimation Trained via Depth from Defocus Cues", In Conference on Computer Vision and Pattern Recognition (CVPR), pp. 7683-7692 (2019).
Hold-Geoffroy, Y., et al., "A Perceptual Measure for Deep Single Image Camera Calibration", In IEEE Conference on Computer Vision and Pattern Recognition (CVPR), pp. 2354-2363 (2018).
Karaali, A., and Jung, C. R., "Edge-Based Defocus Blur Estimation with Adaptive Scale Selection", In IEEE Transactions on Image Processing, vol. 27, No. 3, pp. 1-12 (2017).
Karaali, A., et al., "Deep Multi-Scale Feature Learning for Defocus Blur Estimation", IEEE Transactions on Image Processing, vol. 31, pp. 1-10 (2022).
Karsch, K., et al., "Depth Transfer: Depth Extraction from Video Using Non-Parametric Sampling", IEEE Transactions on Pattern Analysis and Machine Intelligence, vol. 36, No. 11, pp. 2144-2158 (Nov. 2014).
Lee, B., et al., "Bokeh-Loss GAN: Multi-Stage Adversarial Training for Realistic Edge-Aware Bokeh", arXiv:2208.12343v1, pp. 1-17 (Aug. 25, 2022).
Lee, J., et al., "Deep Defocus Map Estimation using Domain Adaptation", In IEEE Conference on Computer Vision and Pattern Recognition (CVPR), pp. 12222-12230 (2019).
Li, Z., and Snavely, N., "MegaDepth: Learning Single-View Depth Prediction from Internet Photos", In IEEE Conference on Computer Vision and Pattern Recognition (CVPR), pp. 2041-2050 (2018).
Liu, S., et al., "Defocus Map Estimation From a Single Image Based on Two-Parameter Defocus Model", IEEE Transactions on Image Processing, vol. 25, No. 12, pp. 5943-5956 (Dec. 2016).
Loshchilov, I., and Hutter, F., "Decoupled Weight Decay Regularization", In International Conference on Learning Representations, pp. 1-18 (2017).
Ma, H., et al., "Defocus Image Deblurring Network with Defocus Map Estimation as Auxiliary Task", IEEE Transactions on Image Processing, pp. 1-12 (2022).
Mcguire, M., et al., "Defocus Video Matting", ACM Transactions on Graphics, vol. 24, No. 3, pp. 567-576 (2005).
Park, J., et al., "A Unified Approach of Multi-scale Deep and Hand-crafted Features for Defocus Estimation", In Proceedings of the IEEE Conference on Computer Vision and Pattern Recognition (CVPR), pp. 1736-1745 (2017).
Peng, J., et al., "BokehMe: When Neural Rendering Meets Classical Rendering", In Proceedings of the IEEE/CVF Conference on Computer Vision and Pattern Recognition (CVPR), pp. 16283-16292 (2022).
Pertuz, S., et al., "Efficient Focus Sampling Through Depth-of-Field Calibration", International Journal of Computer Vision, vol. 112, pp. 342-353 (2015).
Ranftl, R., "Towards Robust Monocular Depth Estimation: Mixing Datasets for Zero-Shot Cross-Dataset Transfer", IEEE Transactions on Pattern Analysis and Machine Intelligence, pp. 1-14 (2020).
Ranftl, R., et al., "Vision Transformers for Dense Prediction", In Proceedings of the IEEE/CVF International Conference on Computer Vision (ICCV), pp. 12179-12188 (2021).
Sakurikar, P., et al., "RefocusGAN: Scene Refocusing using a Single Image", In Proceedings of the European Conference on Computer Vision (ECCV), pp. 1-16 (2018).
Saxena, A, et al., "Make3D: Learning 3D Scene Structure from a Single Still Image", IEEE Transactions on Pattern Analysis and Machine Intelligence, vol. 31, No. 5, pp. 1-16 (2008).
Saxena, A., et al., "Learning Depth from Single Monocular Images", In Advances in Neural Information Processing Systems (NIPS), pp. 1-8 (2005).
Shi, J., et al., "Just Noticeable Defocus Blur Detection and Estimation", In Proceedings of the IEEE Conference on Computer Vision and Pattern Recognition (CVPR), pp. 657-665 (2015).
Srikakulapu, V., et al., "Depth estimation from single image using defocus and texture cues", In National Conference on Computer Vision, Pattern Recognition, Image Processing and Graphics (NCVPRIPG), pp. 1-4 (2015).
Subbarao, M., and Surya, G., "Depth from Defocus: A Spatial Domain Approach", International Journal of Computer Vision, vol. 13, No. 3, pp. 271-294 (1994).
Tai, Y.-W., and Brown, M. S., "Single Image Defocus Map Estimation Using Local Contrast Prior", In IEEE International Conference on Image Processing (ICIP), pp. 1797-1800 (2009).
Wang, C., et al., "Learning Depth from Monocular Videos using Direct Methods", In Proceedings of the IEEE Conference on Computer Vision and Pattern Recognition (CVPR), pp. 2022-2030 (2018).
Wang, W., et al., "PVT v2: Improved baselines with Pyramid Vision Transformer", Computational Visual Media, vol. 8, No. 3, pp. 415-424 (Sep. 2022).
Watanabe, M., and Nayar, S. K., "Rational Filters for Passive Depth from Defocus", International Journal of Computer Vision, vol. 27, No. 3, pp. 203-225 (1998).
Wu, Z., et al., "DoF-NeRF: Depth-of-Field Meets Neural Radiance Fields", In Proceedings of the 30th ACM International Conference on Multimedia, pp. 1718-1729 (Oct. 10-14, 2022).
Xie, E., et al., "SegFormer: Simple and Efficient Design for Semantic Segmentation with Transformers", 35th Conference on Neural Information Processing Systems (NeurIPS), pp. 1-14 (2021).
Xu, G., et al., "Estimating Defocus Blur via Rank of Local Patches", Proceedings of the IEEE International Conference on Computer Vision (ICCV), pp. 5371-5379 (2017).
Yin, Z., and Shi, J., "GeoNet: Unsupervised Learning of Dense Depth, Optical Flow and Camera Pose", In Proceedings of the IEEE Conference on Computer Vision and Pattern Recognition (CVPR), pp. 1983-1992 (2018).
Zhang, A., and Sun, J., et al., "Joint Depth and Defocus Estimation From a Single Image Using Physical Consistency", IEEE Transactions on Image Processing, vol. 30, pp. 3419-3433 (2021).
Zhang, X., et al., "Spatially variant defocus blur map estimation and deblurring from a single image", Journal of Visual Communication and Image Representation, vol. 35, pp. 257-264 (2016).
Zhou, C., et al., "Coded Aperture Pairs for Depth from Defocus", In IEEE International Conference on Computer Vision, pp. 1-8 (2009).
Zhu, R., et al., "Single View Metrology in the Wild", In European Conference on Computer Vision (ECCV), pp. 316-333 (2020).
Zhu, X., et al., "Estimating Spatially Varying Defocus Blur From A Single Image", IEEE Transactions on Image Processing, vol. 22, No. 12, pp. 4879-4891 (Dec. 2013).
Zhuo, S., and Sim, T., "Defocus map estimation from a single image", Pattern Recognition, vol. 44, pp. 1852-1858 (2011).
Zhuo, W., et al., "Indoor Scene Structure Analysis for Single Image Depth Estimation", In Proceedings of the IEEE Conference on Computer Vision and Pattern Recognition (CVPR), pp. 614-622 (2015).

(56) References Cited

OTHER PUBLICATIONS

"Blender Foundation", blender.org, Retrieved from Internet URL : https://www.blender.org/about/foundation/, accessed on Oct. 9, 2023, pp. 7.

"Search for 3D models, materials and collections", Evermotion, Arch Models vol. 276, Retrieved from Internet URL : https://evermotion.org/, accessed on Oct. 9, 2023, pp. 4.

Ruan, L., et al., "AIFNet: All-in-Focus Image Restoration Network Using a Light Field-Based Dataset", IEEE Transactions on Computational Imaging, vol. 7, pp. 675-688 (2021).

* cited by examiner

SINGLE IMAGE CAMERA PARAMETER ESTIMATION

BACKGROUND

Various types of computer vision models do not include depth of field and/or blur estimation. As a result, images generated by these type of computer vision models are entirely in focus. Other computer vision models generate per-pixel blur estimation. However, when inserting objects to be rendered by a virtual camera in a photo, in order to avoid unwanted effects, it is necessary that the virtual camera and lens share the same parameters as the physical camera and lens used to capture the photo.

SUMMARY

Embodiments are directed to parametric lens estimations, derived from a single image, for controlling various attributes of an image, objects within the image, and/or a virtual stage associated with the image. Advantageously, the systems and methods described are directed towards determining the focus (e.g., depth) and blur factor (e.g., scaled aperture) associated with a single input image. In particular, a set of neural networks are used to produce pixel-wise depth and disparity estimates in accordance with an embodiment. As a result, in various embodiments, the output of the set of neural networks are used to estimate lens parameters for a virtual camera (e.g., rendering application or other application capable of generating an image). For example, this allows objects to be inserted into the image and automatically assigned depth and blur values such that the objects have the correct three dimensional appearance relative to the focal plane of the image.

In an embodiment, a defocus network determines signed defocus values for pixels within an image and generates a signed defocus map. In addition, in such embodiments, a disparity network determines disparity values for the pixels within the image and generates a disparity map. In one example, the resulting signed defocus map and disparity map are used to estimate the camera lens parameters by at least performing a least squares fit on the signed defocus map (e.g., the signed defocus values) and the disparity map. Furthermore, the defocus network and the disparity network are jointly trained using constraints associated with a physical camera (e.g., circle of confusion lens estimation).

The systems and methods described are capable of determining camera lens parameters for controlling the depth of field values associated with objects from a single image. For example, the camera lens parameters are obtained using the linear least square algorithm based on the output of the set of neural networks (e.g., by at least fitting a line to the output of the set of neural networks). In various embodiments, determining the camera lens parameters from the image enables the insertion of objects within the image with realistic and/or accurate depth of field and blur (e.g., such that the objects appear three-dimensional). Furthermore, in such embodiments, the three-dimensional objects can be moved around the image and maintain realistic and/or accurate depth of field and blur.

BRIEF DESCRIPTION OF THE DRAWINGS

The present invention is described in detail below with reference to the attached drawing figures, wherein.

DETAILED DESCRIPTION

Embodiments described herein generally relate to determining camera parameters such as the focus disparity and the blur factor from a single image. In accordance with some aspects, the systems and methods described are directed to estimation and/or computation of camera lens parameters based on analysis of an input image by a set of machine learning models. For example, the set of machine learning models generate a signed defocus map and a disparity map which is then used to determine the camera parameters. In various embodiments, the linear least squares algorithm is used to determine the camera parameters (e.g., the blur factor and the focus disparity) based on the signed defocus map and the disparity map. In one example, a line is fit to a set of points included in the signed defocus map and the disparity map and the slope and the offset for the line (e.g., generated by applying the linear least square algorithm) are used as the camera parameters (e.g., the blur factor and the focus disparity).

Furthermore, in various embodiments, the set of machine learning models include a defocus model and a disparity model. In addition, in one example, the defocus model and the disparity model are trained jointly using the combination of the loss (e.g., L1 loss) and a multi-scale scale-invariant gradient matching loss (e.g., evaluated at four different scales). In an embodiment, the defocus model and the disparity model are trained using a combination of synthetic data and photographs captured using physical cameras. For example, blur effects or other effects generated by a computing device can be added to photographs captured using physical cameras.

Other solutions do not estimate various attributes of images such as depth of field and/or blur or require stereo images to generate such estimations. Furthermore, other solutions that use non-parametric approaches to estimate these values produce per-pixel blur estimates, which do not allow advanced image editing tasks such as virtual object insertion and/or movement within the image. In one example, objects inserted into the image have unwanted effects or are otherwise not displayed with the correct depth of field and/or blur attributes. Furthermore, in such examples, editing of the image and/or frame (e.g., in the case of videos) is required in order to eliminate unwanted effects and/or add additional effect (e.g., blur) to make the object appear more realistic in the image.

Aspects of the technology described herein provide a number of improvements over existing technologies. For instance, the parametric estimation of the camera lens parameters allows the insertion of three-dimensional objects in shallow depth of field images. In another example, a virtual stage is created from a single image and various objects can be placed and moved around the virtual stage while maintaining the correct depth of field and blur values. In such examples, a three-dimensional virtual stage including three-dimensional objects is generated from a single two-dimensional image. In addition, the camera parameters determined using the systems and methods described in the present disclosure, for example, can apply various effects to images such as defocus and/or blur magnification.

Figure 1:
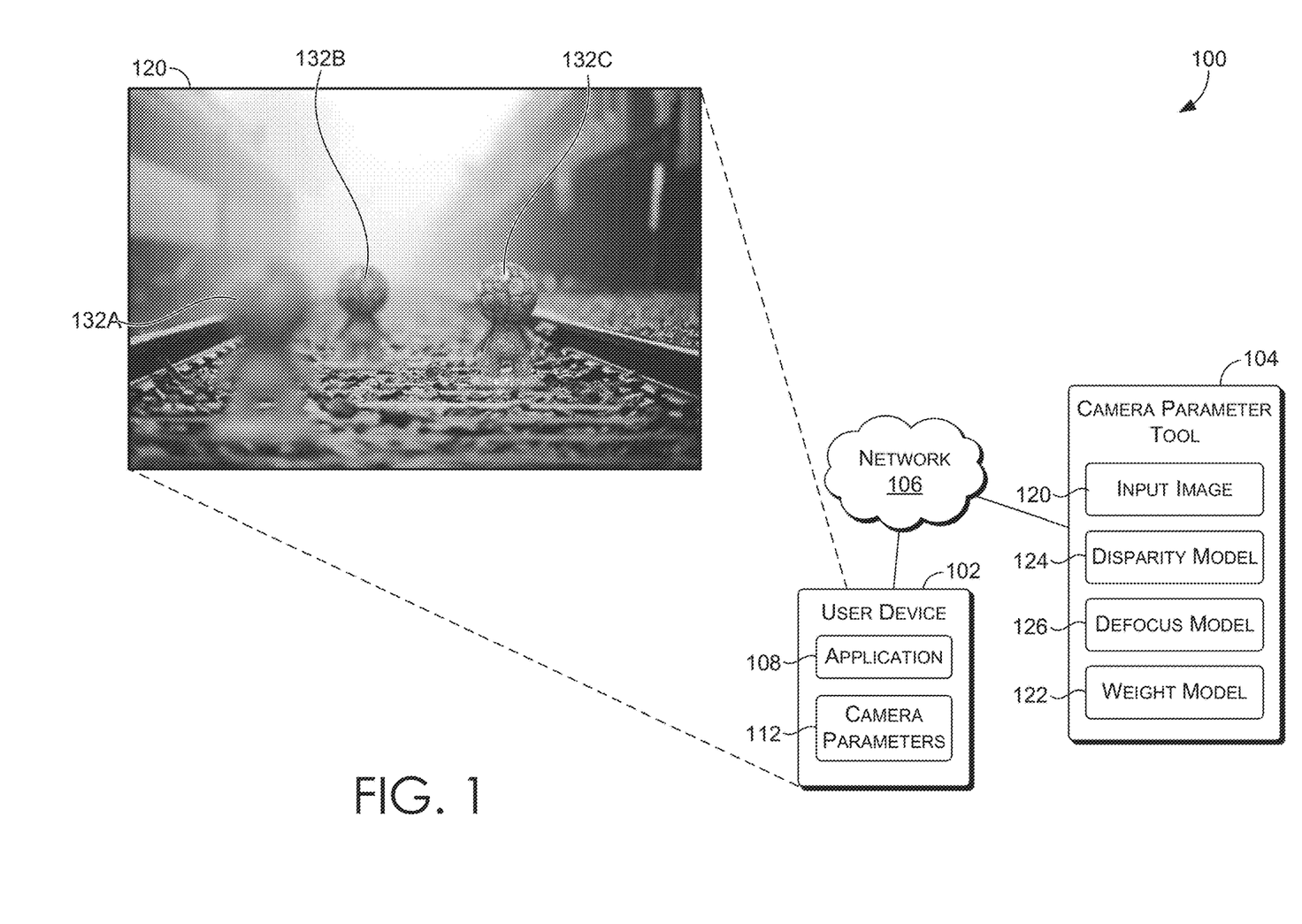
FIG. 1 depicts an environment in which one or more embodiments of the present disclosure can be practiced.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 9.

It should be understood that operating environment 100 shown in FIG. 1 is an example of one suitable operating environment. Among other components not shown, operating environment 100 includes a user device 102, camera parameter tool 104, and a network 106. Each of the components shown in FIG. 1 can be implemented via any type of computing device, such as one or more computing devices 900 described in connection with FIG. 9, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the camera parameter tool 104 includes multiple server computer systems cooperating in a distributed environment to perform the operations described in the present disclosure.

User device 102 can be any type of computing device capable of being operated by an entity (e.g., individual or organization) and obtains data from camera parameter tool 104 and/or a data store which can be facilitated by the camera parameter tool 104 (e.g., a server operating as a frontend for the data store). The user device 102, in various embodiments, has access to or otherwise maintains camera parameters 112 which are used to set and/or modify attributes (e.g., depth, blur, etc.) of a set of objects 132A-132C in an input image 120. For example, the application 108 includes a render application that simulates a camera and uses the camera parameters 112 to simulate blur and depth of the set of objects 132A-132C inserted into the input image 120, a scene, and/or a virtual stage. In various embodiments, the application 108 uses ray tracing or other techniques to simulate a camera including a lens to generate an image (e.g., the input image 120 including the set of objects 132A-132C).

In some implementations, user device 102 is the type of computing device described in connection with FIG. 9. By way of example and not limitation, the user device 102 can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media can also include computer-readable instructions executable by the one or more processors. In an embodiment, the instructions are embodied by one or more applications, such as application 108 shown in FIG. 1. Application 108 is referred to as a single application for simplicity, but its functionality can be embodied by one or more applications in practice.

In various embodiments, the application 108 includes any application capable of facilitating the exchange of information between the user device 102 and the camera parameter tool 104. For example, the application 108 provides the input image 120 to the camera parameter tool 104 and obtains the camera parameters 112 in order to edit the input image 120 and/or the set of objects 132A-132C. In some implementations, the application 108 comprises a web application, which can run in a web browser, and can be hosted at least partially on the server-side of the operating environment 100. In addition, or instead, the application 108 can comprise a dedicated application, such as an application being supported by the user device 102 and camera parameter tool 104. In some cases, the application 108 is integrated into the operating system (e.g., as a service). It is therefore contemplated herein that "application" be interpreted broadly. Some example applications include ADOBE® SIGN, a cloud-based e-signature service, ADOBE® STAGER, a 3d virtual staging software, and ADOBE ACROBAT®, which allows users to view, create, manipulate, print, and manage documents.

For cloud-based implementations, for example, the application 108 is utilized to interface with the functionality implemented by the camera parameter tool 104. In some embodiments, the components, or portions thereof, of the camera parameter tool 104 are implemented on the user device 102 or other systems or devices. Thus, it should be appreciated that the camera parameter tool 104, in some embodiments, is provided via multiple devices arranged in a distributed environment that collectively provide the functionality described herein. Additionally, other components not shown can also be included within the distributed environment.

As illustrated in FIG. 1, the camera parameter tool 104, in an embodiment, obtains the input image 120 and determines the camera parameters associated with the input image 120 (e.g., estimated camera parameters associated with a physical camera that captured the input image 120). In one example, the camera parameter tool 104 causes a disparity model 124 and a defocus model 126 to process the input image 120 and determines the camera parameters 112 based on the output of the disparity model 124 and the defocus model 126. Furthermore, in various embodiments, the disparity model 124 and the defocus model 126 include various machine learning models such as neural networks, transformers, encoders, decoders, various other machine learning models, or a combination of machine learning models. In addition, the disparity model 124 and the defocus model 126, in various embodiments, include the same architecture (e.g., same machine learning model).

In various embodiments, the disparity model 124 generates a disparity map and the defocus model 126 generates a signed defocus map. For example, as described in greater detail below, the disparity map includes per-pixel disparity values for the input image 120 and the signed defocus map includes per-pixel signed defocus values. In an embodiment, a line is fit to the outputs of the disparity model 124 and the defocus model 126 and the parameters of the line are obtained and used to determine the camera parameters 112.

In various examples including lens-based optical systems (e.g., physical or simulated cameras), the portions of the images (e.g., scene points) that are at and/or along the focal plane (e.g., at depth $z_f$) appear sharp. In addition, in such examples, rays incoming from points at any other depth will converge either in front of or behind a sensor (e.g., camera sensor). Furthermore, a point at depth z will project as a circle of diameter c on the sensor (e.g., the circle of confusion), in an example. In various embodiments, the relationship between these depth z, lens aperture A, and the focal length f is given by the following equation:

$$c = Af \left| \frac{z - z_f}{z(z_f - f)} \right| \approx Af \left| \frac{z - z_f}{zz_f} \right|.$$

Where, in such embodiments, the approximation is derived from the hypothesis that z>>f. Furthermore, the relationship in the equation, for example, provides the amount of blur, as measured by the circle of confusion, for every pixel in an image with known depth z. In various embodiments, the depth creates a non-linear relationship between the camera parameters 112 (e.g., (A, f, $z_f$)) and pixel values (c,z). Therefore, in an embodiment, depth z is replaced by disparity d=1/Z and the equation above is rewritten as:

$$c \approx Af|d - d_f|,$$

making the relationship linear. In various embodiments, the equation can be further simplified by using signed defocus $c_s$, where $c_s$ is negative if $d<d_f$, and positive otherwise. As a result, in such embodiments, substituting these values into the equation, the diameter of the circle of confusion is now given by the following equation:

$$c_s = \kappa(d - d_f),$$

where $d_f=1/z_f$ is the disparity at the focal plane and $\kappa=Af$ is the blur factor (e.g., scaled aperture). In one example, the disparity at the focal plane and the blur factor are used as the camera parameters 112 by the application 108. Furthermore, in various embodiments, the camera parameter tool 104 determines the camera parameters 112 based on the equation above using data generated by the disparity model 124 and the defocus model 126.

In an embodiment, the camera parameter tool 104 estimates or otherwise determines the focus disparity $d_f$ and the blur factor Af from the input image 120 (e.g., a single image). For example, the defocus model 126 outputs a signed defocus map $\hat{C}_s$ (e.g., $c_s = \kappa (d-d_f)$) and the disparity model 124 outputs a disparity map $\hat{D}$. In various embodiments, the disparity model 124 and the defocus model 126 are trained jointly such that the disparity values and defocus values generated are consistent. In one example, the disparity model 124 and the defocus model 126 are trained using a combination of an L1 loss $\ell_1$ and a multi-scale scale-invariant gradient matching loss $\ell_{msg}$ (e.g., evaluated at four different scales) given by the following equations:

$$\ell_{defocus} = \lambda_1 \ell_1(\hat{C}_s, C_s) + \lambda_2 \ell_{msg}(\hat{C}_s, C_s),$$

$$\ell_{disp} = \lambda_3 \ell_1(\hat{D}, D) + \lambda_4 \ell_{msg}(\hat{D}, D),$$

with D and $C_s$ denoting the ground truth disparity and signed defocus maps respectively and $\ell_{defocus}$ representing the loss value for training the defocus model 126 and $\ell_{disp}$ representing the loss value for training the disparity model 124.

In addition, in an embodiment, a physical consistency loss helps ensure that the defocus and disparity are consistent with each other. For example, using ground truth camera parameters (e.g., included in a training data set, obtained from synthetic data, etc.), a signed defocus map is computed from the estimated disparity map $\tilde{C}_s = \kappa (\hat{D} - d_f)$ and a disparity map is computed from the estimated defocus map $\tilde{D} = \hat{D}/\kappa + d_f$. In such an example, the physical consistency between the disparity model 124 and the defocus model 126 is enforced by minimizing:

$$\ell_{pc} = \lambda_5 \ell_1(\tilde{D}, D) + \lambda_6 \ell_1(\tilde{C}_s, C_s).$$

In an embodiment, the camera parameters 112 ($\hat{d}_f, \hat{\kappa}$) (e.g., disparity and blur) are determined based on the outputs of the disparity model 124 and the defocus model 126 (e.g., disparity map and signed defocus map) using the following equation:

$$(\hat{d}_f, \hat{\kappa}) = \underset{d_f, \kappa}{\operatorname{argmin}} \sum_{i=1}^{N} (\hat{C}_s(i) - \kappa(\hat{D}(i) - d_f))^2,$$

which can be solved by fitting a line. For example, the equation can be solved by using linear least square to determine the parameters ($\hat{d}_f$, $\hat{\kappa}$). In an embodiment, the parameter loss compares the estimated blur factor $\hat{\kappa}$ and focus disparity $\hat{dd}_f$ with the ground truth:

$$\ell_{param} = \lambda_7 \ell_1(\hat{\kappa}, \kappa) + \lambda_8 \ell_1(\hat{d}_f, d_f).$$

Furthermore, in various embodiments, the camera parameter tool 104 (e.g., the disparity model 124 and the defocus model 126) is trained end-to-end using the following equation:

$$\ell = \ell_{defocus} + \ell_{disp} + \ell_{pc} + \ell_{param}.$$

In an embodiment, to test the result of training the disparity model 124 and the defocus model 126, a reconstructed signed defocus map is generated from the disparity map $\hat{D}$ and the camera parameters 112 ($\hat{d}_f$, $\hat{\kappa}$). In various embodiments, during inferencing, the input image 120 is provided to the camera parameter tool 104 (e.g., over the network 106) and the disparity model 124 and the defocus model 126 generate the disparity map and signed defocus map respectively. In one example, the disparity map indicates a disparity value associated with each pixel in the input image 120 and the signed defocus map indicates a defocus value (e.g., blur) associated with each pixel in the input image. In various embodiments, as described in greater detail below in connection with FIG. 3, the weight model 122 outputs weight values assigned to pixels of the input image 120. For example, the weight values include values between zero and one and indicate weights to apply to corresponding values in the signed defocus map and/or the disparity map.

As described in greater detail below in connection with FIG. 4, in various embodiments, the disparity values and the defocus values can be plotted (e.g., on a Cartesian plane) where the signed defocus values are represented by the following equation c≈Af|d−d_f|. In such embodiments, the camera parameters 112 are determined based on a linear fit of the disparity values and the defocus values by at least computing or otherwise determining the least-square solution by at least computing the pseudo-inverse. In one example, a subset of the signed defocus map and the disparity map is used when performing the linear fit. In yet another example, the process of selecting a random and/or pseudo-random subset of the signed defocus map and the disparity map is performed a number of iterations (e.g., one hundred times) and the linear fit for each iteration is determined. Furthermore, in such an example, the mean or other value representing the statistical distribution of the iterations is determined and used as the camera parameters 112.

During training, in various embodiments, real data (e.g., images captured by a physical camera), semi-synthetic data (e.g., images captured by a physical camera with blur added to the images), and synthetic data (e.g., images generated by a renderer or other application) are used alone or in combination to train the disparity model 124 and the defocus model 126. In one example, images captured by a physical camera are modified to add defocus and blur such that the amount of defocus and blur is used as ground truth information during training. In another example, the renderer generates synthetic images where the defocus and blur value for pixels of the images are extracted from the images and/or obtained from the renderer and are used as ground truth information during training.

Figure 2:
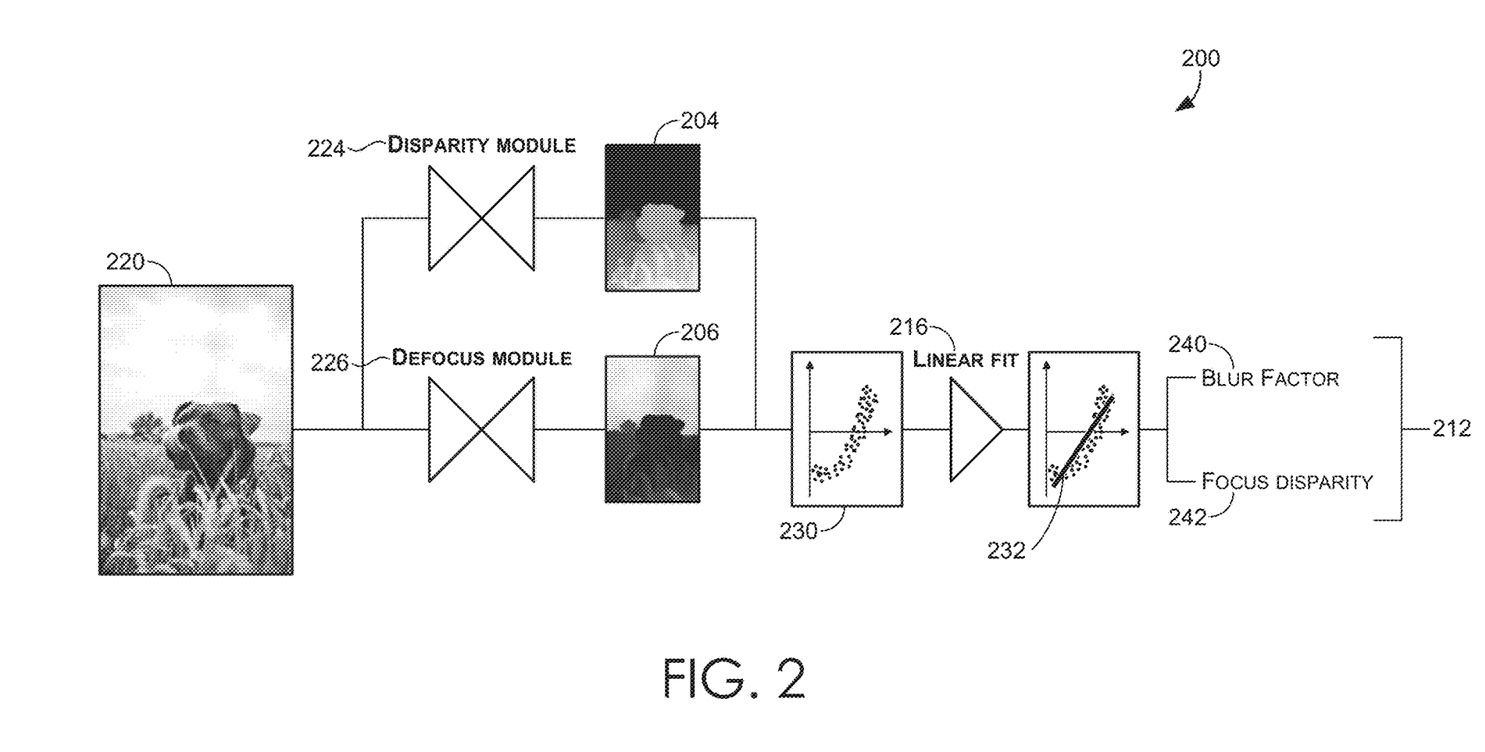
FIG. 2 depicts an environment in which camera parameters are determined based on a single image, in accordance with at least one embodiment.

FIG. 2 illustrates an environment 200 in which camera parameters 212 are determined based on a single image (e.g., an input image 220) in accordance with at least one embodiment. In various embodiments, a disparity model 224 and a defocus model 226 are used to determine camera parameters 212 including a blur factor 240 and a focus disparity 242. As described above in connection with FIG. 1, the camera parameters 212 are useable to create images and/or modify existing images (e.g., inserting objects within a virtual stage). In one example, the disparity model 224 and the defocus model 226 are included in the camera parameter tool 104 as described above in connection with FIG. 1.

In various embodiments, the disparity model 224 obtains the input image 220 as an input and generates a disparity map 204. In one example, the disparity map 204 includes a set of values indicating depth and/or disparity corresponding to pixels of the input image 220. As illustrated in FIG. 2, the darker portions of the disparity map 204 indicate higher values corresponding to the pixels (e.g., further away from the focal depth of the input image 220) and the lighter portions of the disparity map 204 indicate lower values corresponding to the pixels (e.g., closer to the focal depth of the input image 220). Although the disparity map 204 is illustrated as an image in FIG. 2, in various embodiments, the disparity map 204 includes a depth value and/or disparity value for each pixel in the input image 220. In addition, the values of the disparity map 204, in various embodiments, are determined based on the inverse of a distance from the focal plane of the input image 220.

In an embodiment, the defocus model 226 obtains the input image 220 as an input and generates a signed defocus map 206. In one example, the signed defocus map 206 includes a set of values indicating sharpness and/or blur corresponding to pixels of the input image 220. As illustrated in FIG. 2, the darker portions of the signed defocus map 206 indicate higher values corresponding to the pixels (e.g., sharper portions of the input image 220) and the lighter portions of the signed defocus map 206 indicate lower values corresponding to the pixels (e.g., blurrier portions of the input image 220). Although the signed defocus map 206 is illustrated as an image in FIG. 2, in various embodiments, the signed defocus map 206 includes a blur value for each pixel in the input image 220. In addition, the values of the signed defocus map 206, in various embodiments, are determined based on the focal plane, where the value is negative if the depth associated with the pixel is less than the depth of the focal plane and positive if the depth associated with the pixel is greater than the depth of the focal plane.

In various embodiments, the output of the disparity model 224 and the defocus model 226 (e.g., the disparity map 204 and the signed defocus map 206) includes a set of values that are represented on a Cartesian plane 230. For example, the values included in the disparity map (e.g., depth and/or disparity) are plotted along the x-axis and the values included in the signed defocus map are plotted along the y-axis. In an embodiment, a linear fit model 216 (e.g., least squares, linear regression, etc.) obtains the disparity map 204 and the signed defocus map 206 and outputs the parameters for the line 232 that fits the values plotted in the Cartesian plane 230. In one example, the line 232 is represented by the equation $c \approx Af(d-d_f)$ where Af represents the blur factor 240 and $d_f$ represents the focus disparity 242.

In various embodiments, the parameters of the line 232 (e.g., the blur factor 240 and focus disparity 242) are used as the camera parameters 212. For example, the camera parameters 212 are an output of the camera parameter tool 104 as described above in connection with FIG. 1 and can be used by an application to modify the input image 220 (e.g., insert an image with the accurate depth and blur into the input image 220). In addition, the linear fit model 216, in various embodiments, samples a subset of the values plotted on the Cartesian plane 230 (e.g., a subset of the disparity map 204 and the signed defocus map 206). For example, one hundred points on the Cartesian plane 230 (e.g., values from the disparity map 204 and the signed defocus map 206) are used to generate the line 232. In another example, the linear fit model 216 can repeat this process (e.g., sampling points and fitting the line 232) for a number of iterations and take the mean of the parameters of the line 232.

Figure 3:
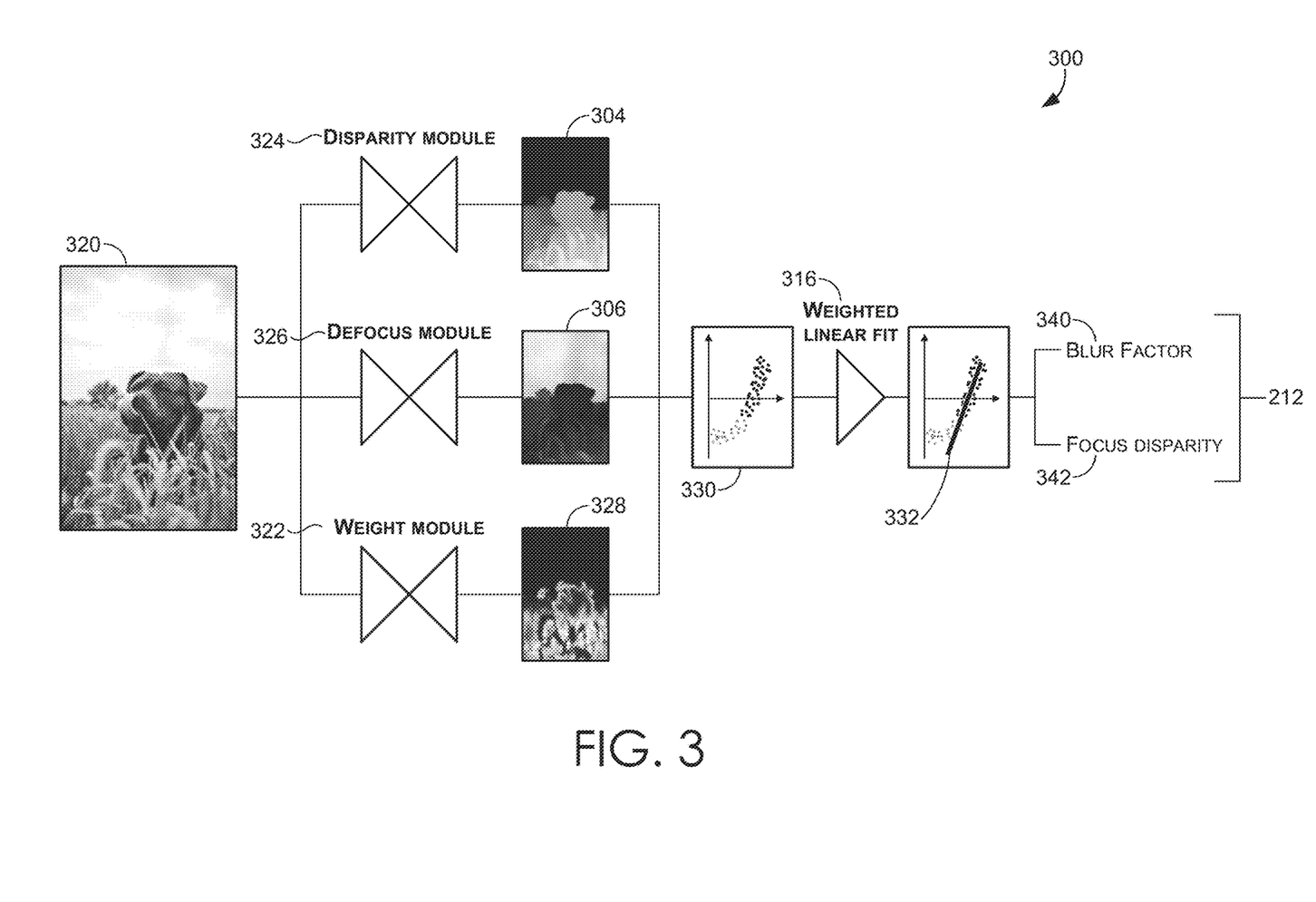
FIG. 3 depicts an environment in which camera parameters are determined based on a single image, in accordance with at least one embodiment.

FIG. 3 illustrates an environment 300 in which camera parameters 312 are determined based on a single image (e.g., an input image 320) in accordance with at least one embodiment. In various embodiments, a disparity model 324, a defocus model 326, and a weight model 322 are used to determine camera parameters 312 including a blur factor 340 and focus disparity 342. Furthermore, in an embodiment, the disparity model 324 and the defocus model 326 generate a disparity map 304 and a signed defocus map 306 based on the input image 320 as described above in connection with FIG. 2. For example, the disparity map 304 and the signed defocus map 306 are plotted on a Cartesian plane 330 and a line 332 is fit to the points using a weighted linear fit model 316 to generate the camera parameters 312 (e.g., the blur factor 340 and the focus disparity 342).

In addition, the weight model 322 generates weight values 308 that indicate weights assigned to the combination of values of the disparity map 304 and the signed defocus map 306 (e.g., points in the Cartesian plane 330). For example, as illustrated in FIG. 3, the darker portions of the weight values 308 receive a lower weight values (e.g., are given less influence in fitting the line 332 by the weighted linear fit model 316) and the lighter portions of the weight values 308 receive a higher weight value (e.g., are given more influence in fitting the line 332 by the weighted linear fit model 316).

In various embodiments, the weight model 322 improves the robustness of the camera parameter tool 104 as described above in connection with FIG. 1 by at least weighting pixels and/or portions of the input image 320 where defocus values are more accurately determined. For example, by at least overweighting the pixels where defocus is more accurately determined, during the curve fitting operations by the weighted linear fit model 316, improved estimates of the camera parameters are obtained. In the example illustrated in FIG. 3, the weighted linear model 316 ignores the darker portions of the weight values 308, shown in the Cartesian plane as lighted points.

Figure 4:
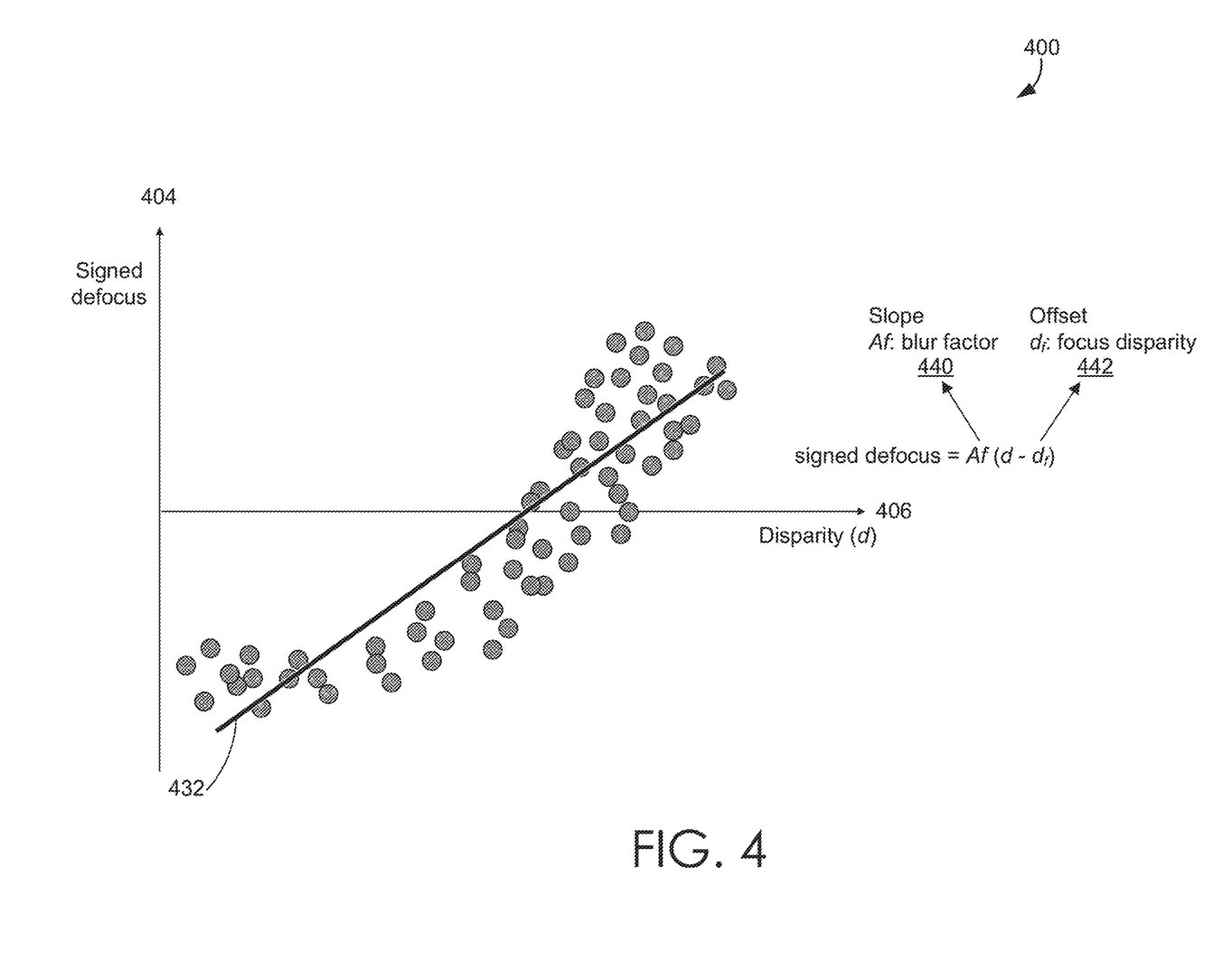
FIG. 4 depicts an environment in which camera parameters are determined based on a disparity map and a signed defocus map, in accordance with at least one embodiment.

FIG. 4 illustrates an environment 400 in which camera parameters 412 are determined based on a single image in accordance with at least one embodiment. In various embodiments, signed defocus values represent values on a y-axis 404 and disparity values represent values on an x-axis 406 where the combination of corresponding signed defocus values and disparity values (e.g., corresponding to a pixel of an input image) represent points on a plane. For example, the signed defocus values and the disparity values are obtained from a signed defocus map and a disparity map respectively. In this example, the signed defocus map and the disparity map are obtained from the defocus model 126 and the disparity model 124 as described above in connection with FIG. 1.

Furthermore, in an embodiment, a line 432 is fit to points of the plane and the parameters of the line 432 represent the camera parameters 412. In various embodiments, a linear fit algorithm such as linear least squares is used to determine the line 432. In addition, the slope of the line 432, in an embodiment, represented a blur factor 440 and the offset represented the focus disparity 442. In an example, the blur factor 440 and the focus disparity 442 are used to generate depth of field information for an application. In various embodiments, the application uses the camera parameters 412 (e.g., the blur factor 440 and the focus disparity 442) to modify the display (e.g., blur and depth) of objects in a virtual stage such that the objects are displayed accurately relative to the object's location in the virtual stage.

Figure 5:
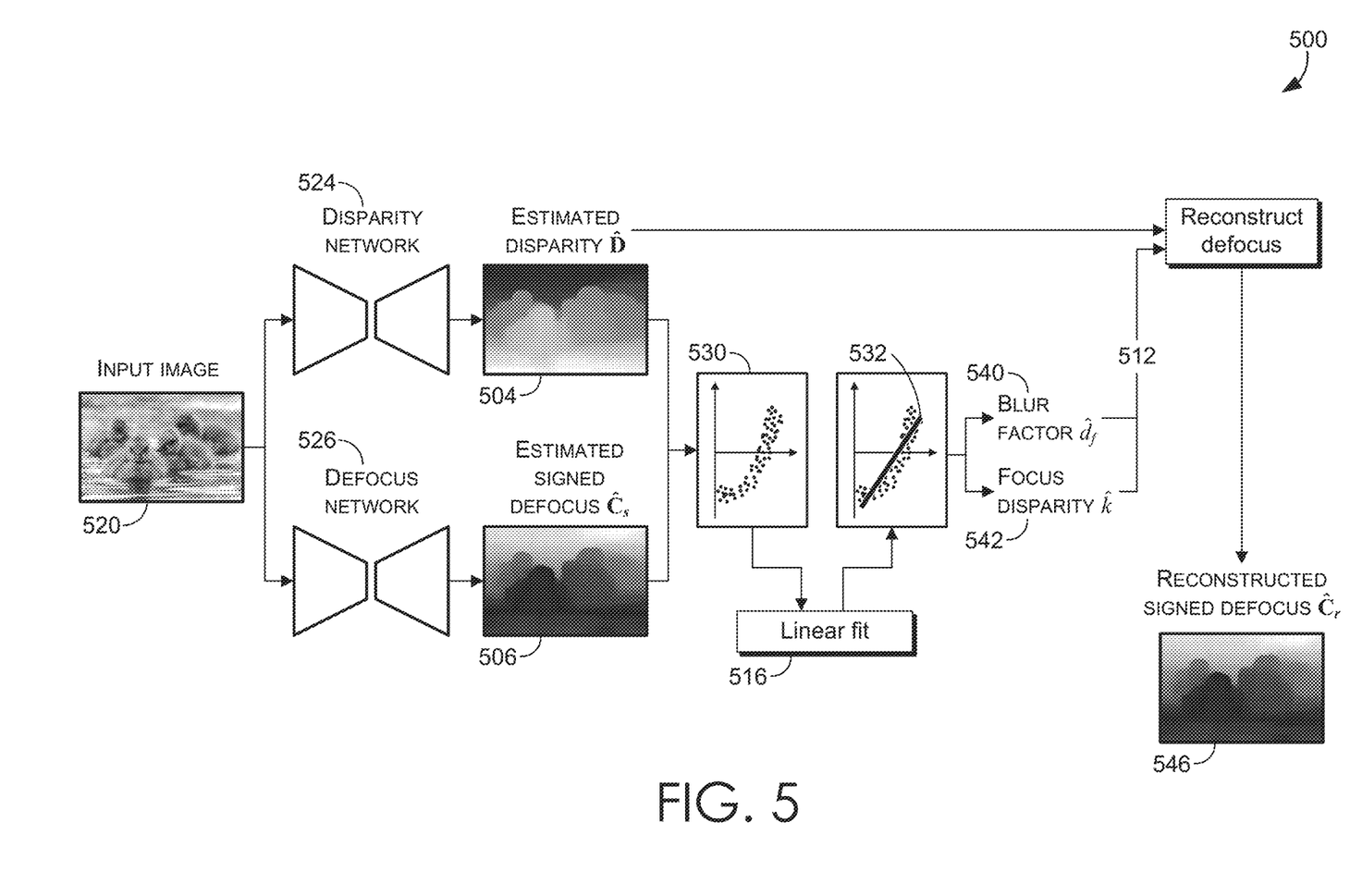
FIG. 5 depicts an environment in which a reconstructed signed defocus map is generated, in accordance with at least one embodiment.

FIG. 5 illustrates an environment 500 in which a reconstructed signed defocus map 516 is generated in accordance with at least one embodiment. In various embodiments, a disparity model 524 and a defocus model 526 are used to determine camera parameters 512 including a blur factor 540 and a focus disparity 542. Furthermore, in an embodiment, the disparity model 524 and the defocus model 526 generate a disparity map 504 and a signed defocus map 506 based on the input image 520 as described above in connection with FIG. 2. For example, the disparity map 504 and the signed defocus map 506 are obtained by a linear fit model 512 and a line 532 is fit to the points using generated camera parameters 512 (e.g., the blur factor 540 and the focus disparity 542).

In addition, in various embodiments, the disparity model 524 and the defocus model 526 are tested by at least reconstructing the signed defocus map 506 to generate the reconstructed signed defocus map 546 based on the camera parameters 512 and the disparity map 504. For example, the equation $c_r = \varkappa (d-d_f)$ can be used to generate the reconstructed signed defocus map 546 $c_r$, where the disparity values d are obtained from the disparity map 504 and the focus disparity $d_f$ and blur factor $\varkappa$ are obtained from the camera parameters 512.

Figure 6:
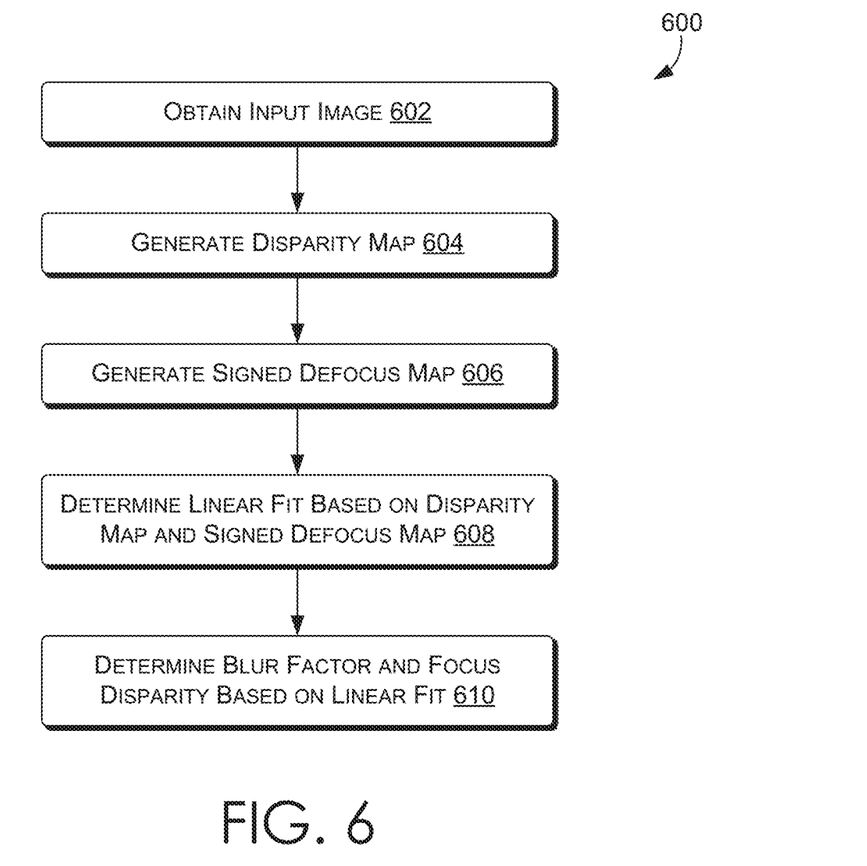
FIG. 6 depicts an example process flow for determining camera parameters based on a disparity map and a signed defocus map, in accordance with at least one embodiment.

FIG. 6 is a flow diagram showing a method 600 for determining camera parameters based on a disparity map and a signed defocus map in accordance with at least one embodiment. The method 600 can be performed, for instance, by the camera parameter tool 104 of FIG. 1. Each block of the method 600 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, the system implementing the method 600 obtains an input image. As described above in connection with FIG. 1, in various embodiments, the camera parameter tool 104 determines camera parameters from a single input image using a disparity model and a defocus model.

At block 604, the system implementing the method 600 generates a disparity map. For example, the disparity model takes as an input the input image and generates the disparity map which indicates disparity and/or depth values associated with pixels of the input image. At block 606, the system implementing the method 600 generates a signed defocus map. For example, the defocus model takes as an input the input image and generates the signed defocus map which indicates defocus values associated with pixels of the input image. In addition, in such an example, the defocus values are negative if the defocus value is less than a focal disparity and positive otherwise.

At block 608, the system implementing the method 600 determines a linear fit based on the disparity map and the signed defocus map. For example, the disparity and signed defocus values corresponding to a pixel are combined and a line is fit to the combination. In various embodiments, the linear least square algorithm is used to fit a line to the set of values included in the disparity map and the signed defocus map. At block 610, the system implementing the method 600 determines the camera parameters based on the linear fit. For example, the parameters of the line (e.g., the slope and the offset) are used as the camera parameters such as blur factor and focus disparity.

Figure 7:
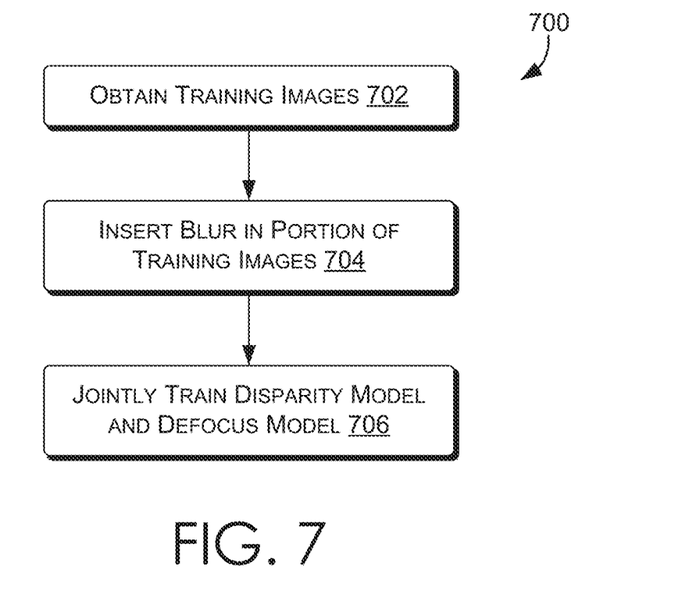
FIG. 7 depicts an example process flow for training a disparity model and a defocus model, in accordance with at least one embodiment.

FIG. 7 is a flow diagram showing a method 700 for training a disparity model and a defocus model in accordance with at least one embodiment. The method 700 can be performed, for instance, by the camera parameter tool 104 of FIG. 1. At block 702, the system implementing the method 700 obtains training images. For example, the training images include a set of images captured by a physical camera. In another example, the training images include images generated by an application simulating a camera including a lens.

At block 704, the system implementing the method 700 inserts blur in a portion of the training images. For example, objects in the training images are modified to include blur generated by a machine learning model. In such examples, an amount of blur (e.g., blur factor) for an image in the training data is maintained by the system implementing the method 700 and is usable as ground truth information during training. In this manner, ground truth information (e.g., camera parameters) can be generated for the training images in accordance with an embodiment.

At block 706, the system implementing the method 700 jointly trains the disparity model and the defocus model. For example, the disparity model and the defocus model are trained using a combination of an L1 loss function and a multi-scale scale-invariant gradient matching loss function (e.g., evaluated at four different scales) as described above in connection with FIG. 1.

Figure 8:
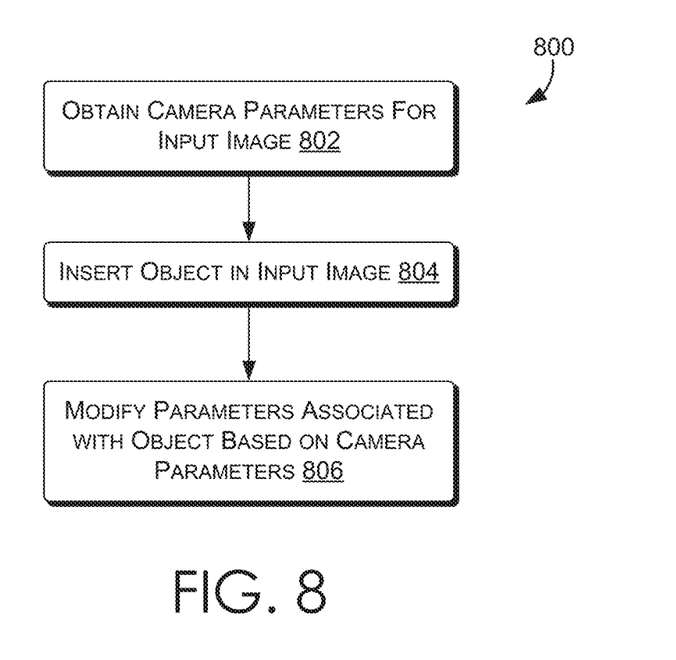
FIG. 8 depicts an example process flow for inserting a three-dimensional object into an image, in accordance with at least one embodiment.

FIG. 8 is a flow diagram showing a method 800 for inserting a three-dimensional object into an image in accordance with at least one embodiment. The method 800 can be performed, for instance, by the application 108 of FIG. 1. At block 802, the system implementing the method 800 obtains camera parameters from an input image. For example, the input image is provided to the camera parameters tool 104 of FIG. 1 and, in response, the camera parameters associated with the input image are provided. At block 804, the system implementing the method 800 inserts an object in the input image. For example, the application includes an image and/or video editing application and the user can select an object and/or images of an object to insert into the input image. In various embodiments, the application includes a set of assets (e.g., objects) which users can insert into images.

At block 806, the system implementing the method 800 modifies parameters associated with the object based on the camera parameters. For example, once the user inserts the object into the input image, the blur factor and depth and/or disparity of the object (e.g., pixel values associated with pixels of the object displayed in the application) are modified such that the appearance of the object is accurate relative to the positon of the object in the input image. In other examples, as the user moves the object around within the input image the camera parameters are used to update and/or modify the blur factor and depth and/or disparity of the object such that the object maintains an accurate representation in the input image.

Figure 9:
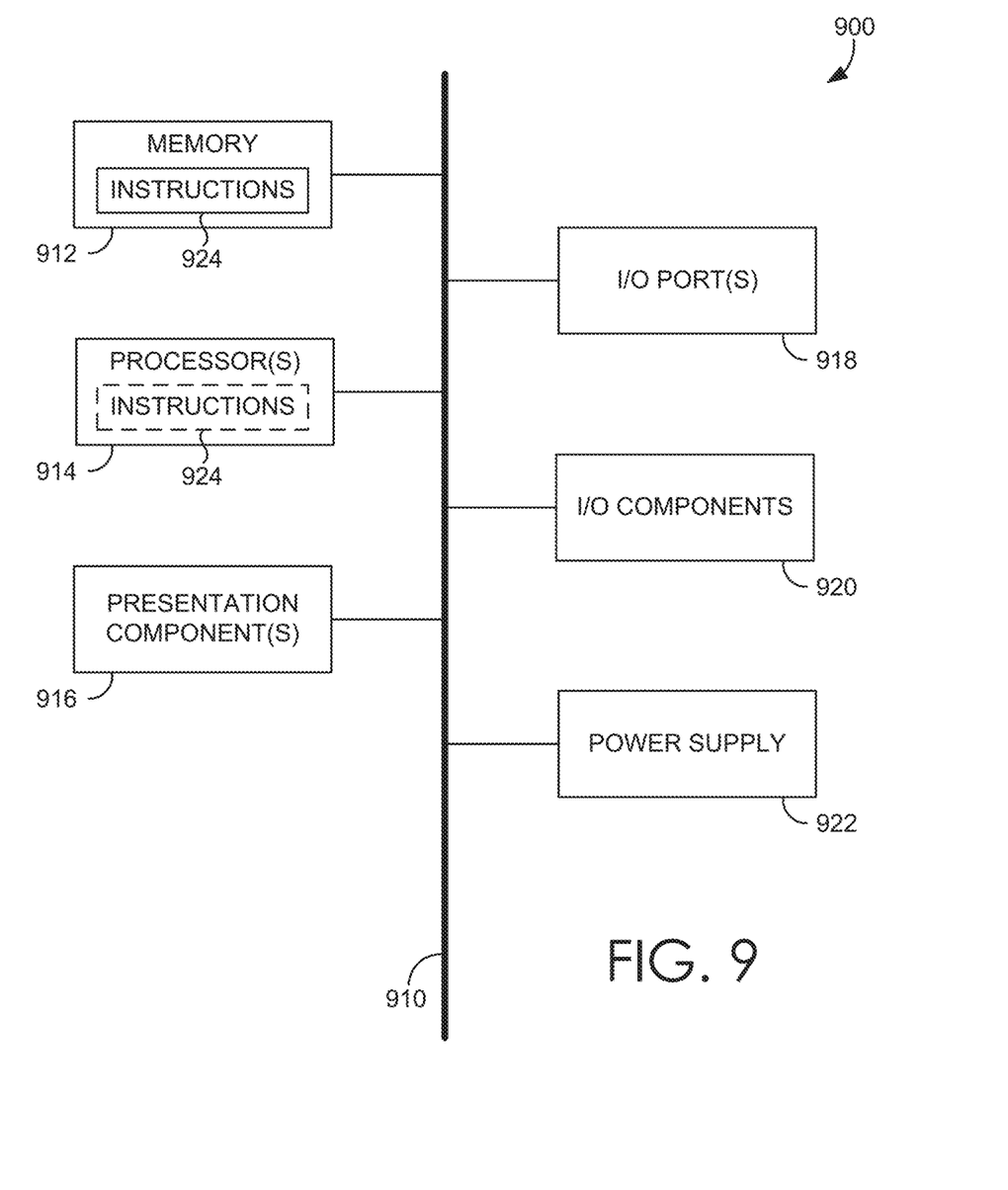
FIG. 9 is a block diagram of an exemplary computing environment suitable for use in implementations of the present disclosure.

Having described embodiments of the present invention, FIG. 9 provides an example of a computing device in which embodiments of the present invention may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present technology. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:
   obtaining an input image including a focal plane;
   causing a disparity model to generate a disparity map indicating disparity values associated with pixels of the input image;
   causing a defocus model to generate a signed defocus map indicating blur values associated with the pixels of the input image; and
   determining a set of camera parameters associated with the input image based on the disparity map and the signed defocus map, the set of camera parameters including a blur factor and a focus disparity, where the set of camera parameters are determined by:
      selecting a subset of pixels of the pixels of the input image; and
      determining a line fitting at least a portion of the disparity values of the disparity map and the blur values of the signed defocus map corresponding to the subset of pixels.

2. The method of claim 1, wherein determining the line further comprises determining the line based on linear least squares algorithm.

3. The method of claim 1, wherein the method further comprises generating a virtual stage based on the input image and the set of camera parameters.

4. The method of claim 3, wherein the method further comprises:
   inserting an object within the virtual stage; and
   modifying a set of pixel values associated with the object based on the blur factor and the focus disparity.

5. The method of claim 1, wherein the method further comprises causing a weight model to assign weight values to a subset of pixels of the pixels of the input image.

6. The method of claim 5, wherein the weight values indicate an influence applied to the disparity values of the disparity map and the blur values of the signed defocus map corresponding to the subset of pixels used in determining the set of camera parameters.

7. The method of claim 1, where the disparity map indicates depth values associated with pixels of the image and the signed defocus map indicates blur values associated with the pixels of the image.

8. A non-transitory computer-readable medium storing executable instructions embodied thereon, which, when executed by a processing device, cause the processing device to perform operations comprising:
  obtaining an image where at least a portion of the image includes blur;
  generating, by a first model, a disparity map of the image;
  generating, by a second model, a signed defocus map of the image; and
  determining a set of camera parameters, including a blur factor and a focus disparity, associated with the image based on the disparity map and the signed defocus map by at least determining a line that fits at least a portion of the disparity map and the signed defocus map.

9. The medium of claim 8, wherein the disparity map indicates depth values associated with pixels of the image.

10. The medium of claim 9, wherein the signed defocus map indicates blur values associated with the pixels of the image.

11. The medium of claim 8, wherein determining the line further comprises using linear least squares algorithm.

12. The medium of claim 8, wherein the blur factor and the focus disparity correspond to parameters of the line.

13. The medium of claim 8, wherein the first model and the second model are jointly trained based on synthetic data.

14. The medium of claim 8, wherein the operations further comprises causing a weight model to assign weight values to a subset of pixels of the pixels of the image.

15. The medium of claim 14, wherein the weight values indicate an influence applied to disparity values of the disparity map and blur values of the signed defocus map corresponding to the subset of pixels used in determining the set of camera parameters.

16. A system comprising:
  a memory component; and
  a processing device coupled to the memory component, the processing device to perform operations comprising:
    obtaining an image where a camera parameter is unknown;
    causing a disparity model to generate a disparity map based on the image;
    causing a defocus model to generate a signed defocus map of the image; and
    determining the camera parameter based on the disparity map and the signed defocus map by at least determining a line that fits at least a portion of the disparity map and the signed defocus map.

17. The system of claim 16, wherein the camera parameters include a blur factor or focus disparity.

18. The system of claim 16, wherein the signed defocus map includes blur values associated with pixels of the image, where the blur values include positive and negative values.

19. The system of claim 16, wherein the disparity map indicates a distance relative to a focal plane within the image.

20. The system of claim 16, wherein the disparity model and the defocus model are jointly trained based at least in part on representations of blur added to images captured by a physical camera.

* * * * *